Jan. 23, 1968  M. S. ACKERMAN  3,364,829
RECHARGEABLE STROBOSCOPIC FLASH ATTACHMENT
Filed June 2, 1967
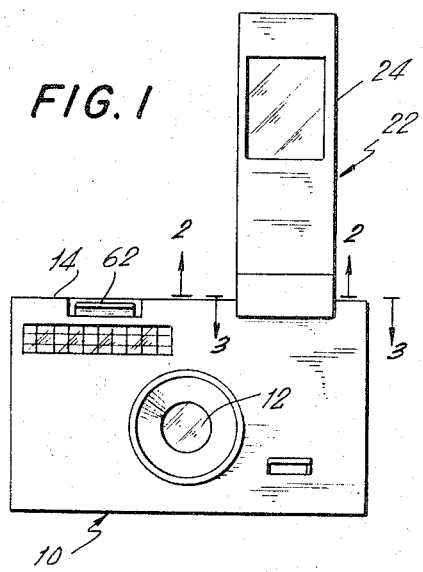
FIG. 1
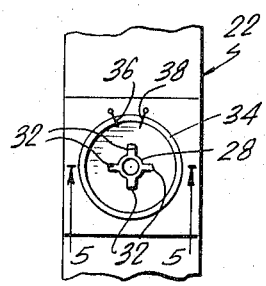
FIG. 2
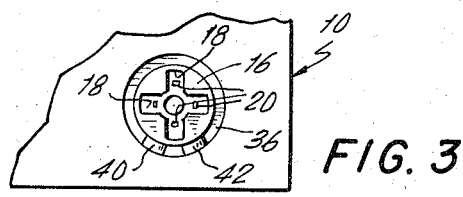
FIG. 3
FIG. 5
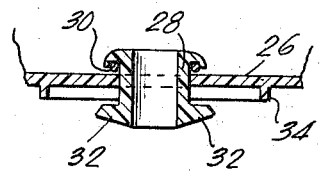
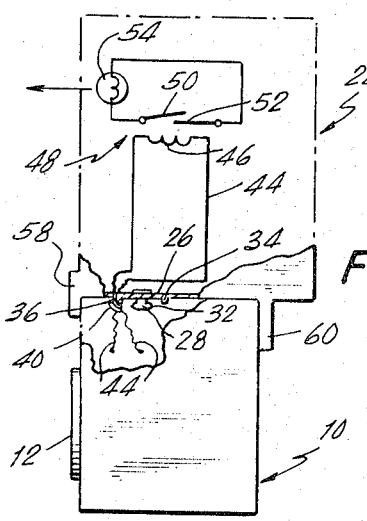
FIG. 4
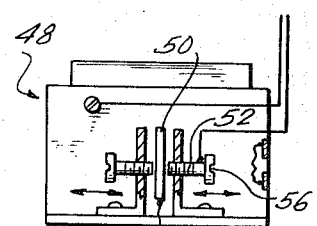
FIG. 6
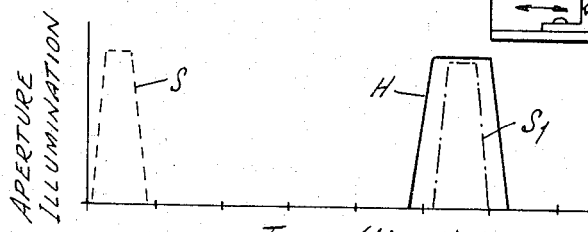
FIG. 7
INVENTOR.
MARTIN S. ACKERMAN
BY Kenneth S. Goldfarb
ATTORNEY

United States Patent Office 3,364,829
Patented Jan. 23, 1968

3,364,829
RECHARGEABLE STROBOSCOPIC FLASH ATTACHMENT
Martin S. Ackerman, East Hills, N.Y., assignor to Perfect Film & Chemical Corporation, Manhasset, N.Y., a corporation of Delaware
Filed June 2, 1967, Ser. No. 643,088
5 Claims. (Cl. 95—11.5)

ABSTRACT OF THE DISCLOSURE

A rechargeable stroboscopic flash attachment on a camera which includes a fitting rotatably mounted in a housing and adapted to be disposed in a flashcube-receiving receptacle of a camera for actuating the shutter control mechanism. Contact means are also secured to the housing for engaging the electric contacts in the receptacle. A time-delay relay is mounted in the housing as is a stroboscopic electronic lamp so that the time-delay relay effectively delays actuation of the flash unit so as to synchronize the flash unit with the timing induced by the shutter control mechanism.

---

This invention relates to a rechargeable stroboscopic flash attachment for a camera having a flashbulb or flashcube operating circuit.

Various types of cameras have been devised which are adapted for either daylight photography or flashbulb or flashcube photography. Such cameras may be of the type disclosed in the patent to L. F. Anderson et al., No. 3,244,087, and employ a shutter mechanism which operate without any time delay during daylight photography but which camera is provided with a flashlamp synchronizing mechanism for producing a delay when flashlamps or flashcubes are employed. This is necessitated because of the delay in reaching the peak light intensity of the flashlamp or flashcube. Such a synchronizing mechanism is disclosed in the patent to D. M. Petersen, No. 3,139,805.

In the patent to O. T. Casebeer et al., No. 3,312,086, there is disclosed an indexing mechanism used in connection with flashcubes for rotating the flashcube so as to present an unused flashbulb in the front of the camera for successive firing.

Briefly, the concept of this invention is to provide a rechargeable stroboscopic flash attachment adapted to be mounted in a simple manner on a camera employing a flashcube-receiving receptacle having a pair of electrical contacts connected to the flashcube operating circuit on the camera and having a shutter control mechanism of the type shown in Patent No. 3,139,805, and having the flashcube indexing mechanism of the type shown in Patent No. 3,312,086. In accomplishing the purpose of the invention, a housing having a time-delay means therein and a rechargeable stroboscopic flash unit is fixedly attached to the camera and has a fitting rotatably mounted and extending therebelow for insertion in the flashcube-receiving receptacle. Contact means also depend from the housing for engaging the contacts in the flashcube-receiving receptacle which are connected to the flashcube or flashlamp operating circuit.

Another object of the invention resides in the provision of means for mounting an electronic flash attachment of the rechargeable type on a camera so as to eliminate the necessity for the repeated purchase and use of flashbulbs or flashcubes, thus greatly reducing the cost to the user of flash photography.

Still further objects and features of the present invention reside in the provision of a rechargeable electronic stroboscopic flash attachment for various types and models of cameras now in existence and to be produced in the future that is simple in construction, inexpensive to manufacture, thereby permitting wide distribution and utilization, and which is durable, light in weight, compact and attractive in appearance.

These, together with the various ancillary objects and features of the present invention, which will become apparent as the following description proceeds, are attained by this electronic flash attachment, a preferred embodiment of which is shown in the accompanying drawing, by way of example only, wherein:

FIG. 1 is a front elevational view showing the flash attachment as mounted on a camera;

FIG. 2 is a bottom plan view of the flash attachment looking along the plane of line 2—2 in FIG. 1;

FIG. 3 is a plan view of a portion of the camera showing the flashcube-receiving receptacle;

FIG. 4 is a side elevational view of the flash attachment with portions broken away showing schematically the circuitry of the flash attachment;

FIG. 5 is an enlarged sectional detail view taken along the plane of line 5—5 in FIG. 2;

FIG. 6 is a schematic view illustrating adjusting means used to vary the time delay provided by the time-delay operating means; and FIG. 7 is a chart showing the manner of operation of the invention.

With continuing reference to the accompanying drawing wherein like reference numerals designate similar parts throughout the various views, reference numeral 10 is used to generally designate a camera having a lens opening 12 which is provided with a shutter mechanism, not shown. The camera 10 has its top 14 provided with a flashcube-receiving receptacle 16 having therein prong-receiving sections 18 and a mechanism 20 of the type disclosed in Patent No. 3,139,805. This mechanism is for the purpose of delaying the operation of the shutter mechanism until the flashcube or flashlamp normally used with the camera has reached its peak light intensity.

In carrying out the present invention, the flash attachment generally indicated by reference numeral 22 is encased in a suitable housing 24 having a base plate 26, see FIG. 5, in which a fitting 28 is rotatably mounted and journalled at 30. The fitting 28 includes four actuating prongs 32 adapted to fit in the spaces 18 and the fitting 28 actuates the mechanism 20. The plate has integrally formed therewith a ring 34 adapted to seat in a circular recess 36. Mounted on the ring 34 are a pair of contacts 36 and 38 which are adapted to cooperate with the contacts 40 and 42 provided in the receptacle 16. The contacts 40 and 42 are electrically connected by conductors 44 to the flashcube or flashlamp actuating circuit of the camera 10 while the contacts 36 and 38 are connected through conductors 44 to the coil 46 of the time-delay operating means generally indicated at 48 and which may be in the form of a relay having an armature 50 operating upon excitation of the coil 46. The armature 50 when it engages contact 52 completes an operative electrical circuit to a rechargeable stroboscopic flash unit 54 of otherwise conventional construction. The contact 52 may be adjustable so that the travel of the armature 50 can be varied to provide suitable adjustments for permitting synchronization of the time-delay operating means to conform to the shutter delay induced by the mechanism 20 and the natural variations that will occur in shutter operation due to wear, exposure to the elements, inclusion of foreign matter, and manufacturing tolerances. The contact 52 is made accessible through a screwdriver-receiving aperture so that the slotted head 56 of the contact 52 may be rotated to adjust the position of the contact 52.

The housing 24 is provided with suitable mounting brackets 58 and 60. Of course, other suitable mounting arrangements including fastening means or clamping arrangements may be utilized instead of the brackets 50 for embracing the camera 10.

In operation, the attachment 22 is fitted on the camera with the brackets 58 and 60 embracing the camera and with the fitting 28 extending into the receptacle and with the ring engaged in its corresponding recess 34, and contacts 36 and 38 engaging contacts 40 and 42 respectively. Then, actuation of the shutter release 62 will cause the shutter mechanism, not shown, to open the lens opening 12. At the same time, the mechanism 20 will delay operation of the shutter. To compensate for this delay, the time-delay operating means 48 will delay operation of the stroboscopic unit 54 so that the stroboscopic flash 54 is in synchronization with the operation of the shutter.

In FIG. 7 there is shown a chart illustrating aperture illumination against time units in the operation of the invention. As indicated as S, there is shown in phantom lines the time of operation of a stroboscopic flash unit without any time delay. It will be noted that the operation of a stroboscopic lamp of the type indicated at 54 in the drawing will be substantially simultaneous with the operation of the shutter release 62. The present invention contemplates a time delay in the order ranging between ten to twenty milliseconds, and as shown in the chart an arbitrary substantial number of time units as compared to normal operation S of the flash unit so that the stroboscopic operating curve S1 will be at the optimum time with respect to the shutter operation curve H.

A latitude of modification, substitution and change is intended in the foregoing disclosure, and in some instances, some features of the invention will be employed without a corresponding use of other features. Accordingly, it is appropriate that the appended claims be construed broadly and in a manner consistent with the spirit and scope of the invention herein.

I claim:

1. A rechargeable stroboscopic flash attachment on a camera having a flash cube operating circuit and a flashcube-receiving receptacle provided with a pair of electrical contacts connected to said flashcube operating circuit and having a shutter control mechanism and a flashcube indexing mechanism, comprising a housing having a rechargeable stroboscopic flash unit therein, means fixedly securing said housing to said camera and including a fitting at least partially disposed in said housing and being rotatably mounted thereon, said fitting extending into said receptacle for actuating said shutter control mechanism, contact means secured to said housing engaging said pair of electrical contacts, time-delay operating means in said housing electrically connected to said contact means for time delaying a signal from said flashcube operating circuit, said rechargeable stroboscopic flash unit being operatively electrically connected to said time delay operating means so that said time delay operating means effectively delays actuation of said flash unit so as to synchronize said flash unit with the timing induced by said shutter control mechanism.

2. A flash attachment according to claim 1, wherein said time delay operating means comprises a relay.

3. A flash attachment according to claim 2, wherein adjusting means are included for varying the time delay of said relay.

4. A flash attachment according to claim 1, wherein said time delay operating means comprises a relay having an armature and means for adjusting the travel of said armature to adjust the time delay provided by said relay.

5. A stroboscopic flash attachment on a camera having a flashcube operating circuit and a flashcube-receiving receptacle provided with a pair of electrical contacts connected to said flashcube operating circuit and having a shutter control mechanism and a flashcube indexing mechanism, comprising a plate having a stroboscopic flash unit thereon, means fixedly securing said plate to said camera and including a fitting depending from said plate, said fitting extending into said receptacle for actuating said shutter control mechanism, contact means secured to said plate engaging said pair of electrical contacts, electrical time delay operating means on said plate electrically connected to said contact means for time delaying a signal from said flashcube operating circuit, and a stroboscopic flash unit operatively electrically connected to said time delay operating means so that said time delay operating means effectively delays operating said flash unit so as to synchronize said flash unit with the timing induced by said shutter control mechanism.

References Cited

UNITED STATES PATENTS

| | | | |
|---|---|---|---|
| 2,513,665 | 7/1950 | Nelson | 95—11.5 |
| 2,738,443 | 3/1956 | Danziger | 315—241 |
| 2,755,714 | 7/1956 | Germeshausen | 95—11.5 |
| 2,928,325 | 3/1960 | Harvey. | |
| 3,139,805 | 7/1964 | Peterson. | |
| 3,177,353 | 4/1965 | Schmidt. | |
| 3,205,800 | 9/1965 | Peterson. | |
| 3,244,087 | 4/1966 | Anderson et al. | |
| 3,263,583 | 8/1966 | Schmidt. | |
| 3,294,002 | 12/1966 | Vitkine | 95—11.5 |
| 3,312,086 | 4/1967 | Casebeer et al. | |
| 3,318,217 | 5/1967 | Ernisse. | |
| 3,335,651 | 8/1967 | Williams et al. | 95—11 |

NORTON ANSHER, *Primary Examiner.*

FRED L. BRAUN, *Assistant Examiner.*